(12) United States Patent
Ichikawa

(10) Patent No.: US 8,643,853 B2
(45) Date of Patent: Feb. 4, 2014

(54) RENDERING CONTROL METHOD IN WHICH A PROCESSOR AND A HARDWARE ACCELERATOR CAN BE USED EFFICIENTLY

(75) Inventor: Mikiya Ichikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 193 days.

(21) Appl. No.: 13/137,403

(22) Filed: Aug. 11, 2011

(65) Prior Publication Data

US 2012/0057179 A1   Mar. 8, 2012

(30) Foreign Application Priority Data

Sep. 8, 2010   (JP) .................................. 2010-201385

(51) Int. Cl.
*G06F 3/12* (2006.01)
(52) U.S. Cl.
USPC ......................................................... 358/1.1
(58) Field of Classification Search
USPC ............. 345/505; 358/1.1; 382/304; 707/764
See application file for complete search history.

(56) References Cited

U.S. PATENT DOCUMENTS 6,323,958 B1    11/2001  Shimizu
2011/0141122 A1*  6/2011  Hakura et al. ................ 345/505

FOREIGN PATENT DOCUMENTS

JP          8139953 A      5/1996

* cited by examiner

*Primary Examiner* — Eric A Rust
(74) *Attorney, Agent, or Firm* — Harness, Dickey & Pierce, P.L.C.

(57) ABSTRACT

An image forming apparatus includes a parsing part parsing printing data; plural rendering process parts carrying out a rendering process on the parsed printing data; a band memory to which each of the plural rendering process parts carries out the rendering; a rendering control part carrying out rendering control, based on a parsing result of the parsing part, to cause a predetermined one of the plural rendering process parts to generate intermediate data or carry out the rendering to the band memory; and a data memory storing the intermediate data generated by the predetermined one of the plural rendering process parts. Another of the plural rendering process parts carries out the rendering to the band memory using the intermediate data stored in the data memory.

7 Claims, 8 Drawing Sheets

RENDERING CONTROL METHOD IN WHICH A PROCESSOR AND A HARDWARE ACCELERATOR CAN BE USED EFFICIENTLY

BACKGROUND OF THE INVENTION

1. Field of the Invention

The present invention relates to an image forming apparatus and a rendering control method.

2. Description of the Related Art

Recently, in order to improve a processing speed upon processing a page description language (PDL) for printing an image, one method is to improve the performance of a CPU (Central Processing Unit) and another method is to use a hardware accelerator (which may be abbreviated as HA). A HA is a unit configured to make it possible to improve a processing speed of a personal computer, improve a display speed on a screen, increase the number of colors that can be displayed, and so forth. A processing speed may be improved by replacing a part or a function of a computer with a HA, or carrying out a process by a HA, which process has been carried out by software. The method of using a HA to improve a processing speed is advantageous in that it is possible to reduce the cost although this method lacks versatility.

For example, Japanese Laid-Open Patent Application No. 8-139953 discloses a technology of having both functions of hardware rendering and software rendering to improve a printing speed, and switching between these functions according to whether rendering of a band size can be carried out.

However, in a case where a HA is used to carry out rendering to a band, it is not possible to carry out parallel processing with a CPU since it is necessary to keep the rendering order of drawing commands. Thereby, it may not be possible to efficiently use the CPU and the HA.

SUMMARY OF THE INVENTION

According to an embodiment of the present invention, an image forming apparatus includes a parsing part configured to parse printing data; plural rendering process parts configured to carry out a rendering process on the parsed printing data; a band memory for which rendering is carried out by each of the plural rendering process parts; a rendering control part configured to carry out rendering control, based on a parsing result of the parsing part, to cause a predetermined one of the plural rendering process parts to generate intermediate data or carry out rendering to the band memory; and a data memory configured to store the intermediate data generated by the predetermined one of the plural rendering process parts. Another of the plural rendering process parts carries out rendering to the band memory by using the intermediate data stored in the data memory.

According to another aspect of the embodiment of the present invention, a rendering control method for an image forming apparatus that includes plural rendering process parts and a band memory to which each of the plural rendering process parts carries out rendering, includes parsing printing data; and carrying out rendering control, based on a parsing result of the parsing, to cause a predetermined one of the plural rendering process parts to generate intermediate data or carry out rendering to the band memory; storing the intermediate data generated by the predetermined one of the plural rendering process parts in a data memory in a case where the intermediate data is generated by the predetermined one of the plural rendering process parts; and another of the plural rendering process parts carrying out rendering to the band memory using the intermediate data stored in the data memory.

Other objects, features and advantages of the present invention will become more apparent from the following detailed description when read in conjunction with the accompanying drawings.

DETAILED DESCRIPTION OF THE EMBODIMENT

One embodiment of the present invention has been devised in consideration of the above-mentioned problem, and an object of the embodiment of the present invention is to provide an image forming apparatus and a rendering control method by which in a rendering process, a CPU and a HA can be used efficiently.

Below, with reference to figures, the embodiment of the present invention will be described in detail.

Embodiment

An image forming apparatus according to the embodiment is connected with an external host PC (Personal Computer) via a communication part such as a communication network. The image forming apparatus carries out a rendering process based on a drawing command (printing data) written in a PDL format. The printing data is received from the host PC via the communication network or such. The image forming apparatus carries out a printing process using drawing data obtained through the rendering process.

<Hardware>

Figure 1:
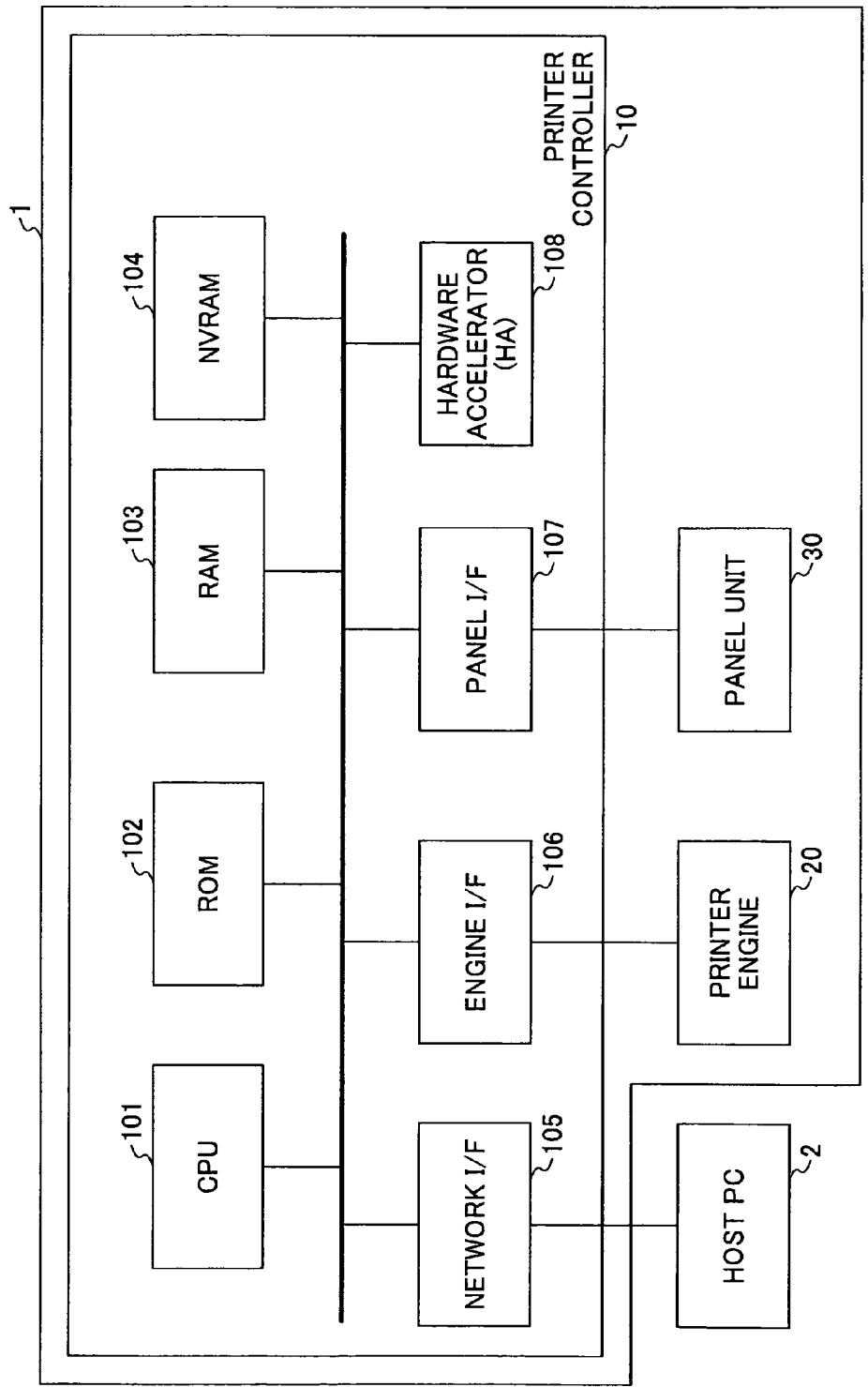
FIG. 1 shows a block diagram of one example of a configuration of an image forming apparatus in one embodiment of the present invention.

FIG. 1 shows a block diagram of one example of a configuration of the image forming apparatus 1. As shown in FIG. 1, the image forming apparatus 1 includes a printer controller 10, a printer engine 20 and a panel unit 30. A host PC 2 transmits printing data in a PDL format to the image forming apparatus 1 via a communication network.

The printer controller 10 controls the image forming apparatus 1. The printer engine 20 prints an image on a sheet of paper. The panel unit 30 acts as an operations panel from which a user inputs information/data, and acts as a display unit which displays states of the image forming apparatus 1 to the user. The printer controller 10 will be described later more specifically.

The printer controller 10 includes a CPU 101, a ROM (Read Only Memory) 102, a RAM (Random Access Memory) 103, a NVRAM (Non-Volatile Random Access Memory) 104, a network I/F (Interface) 105, an engine I/F 106, a panel I/F 107 and a hardware accelerator 108. These respective parts are connected together by a bus in such a manner that data can be received and transmitted therebetween.

The CPU 101 acts as a control part to carry out control of respective units, and arithmetic operation and/or modification of data in a computer. Further, the CPU 101 executes a program stored in the ROM 102.

The ROM 102 stores the program which performs functions of the printer controller 10. The RAM 103 acts as a storage part to be used as a page memory that stores a page created by the printer controller 10 and a work memory used when software is executed by the CPU 101. The NVRAM 104 is a non-volatile memory in which printing condition settings of the image forming apparatus 1 and so forth are stored.

The network I/F 105 is an interface for a peripheral device that has a communication function and is connected with the image forming apparatus 1 via the communication network such as a LAN (Local Area Network) or a WAN (Wide Area Network) built by a wired or wireless data transmission path and the printer controller 10. For example, the network I/F 105 carries out transmission and reception of data with the host PC 2 connected with the communication network.

The engine I/F 106, for example, sends printing instructions to the printer engine 20. The panel I/F 107 carries out input and output of data/information with the panel unit 30.

The hardware accelerator (referred to as HA, hereinafter) 108 carries out a part of a rendering process by hardware.

<Functions>

Figure 2:
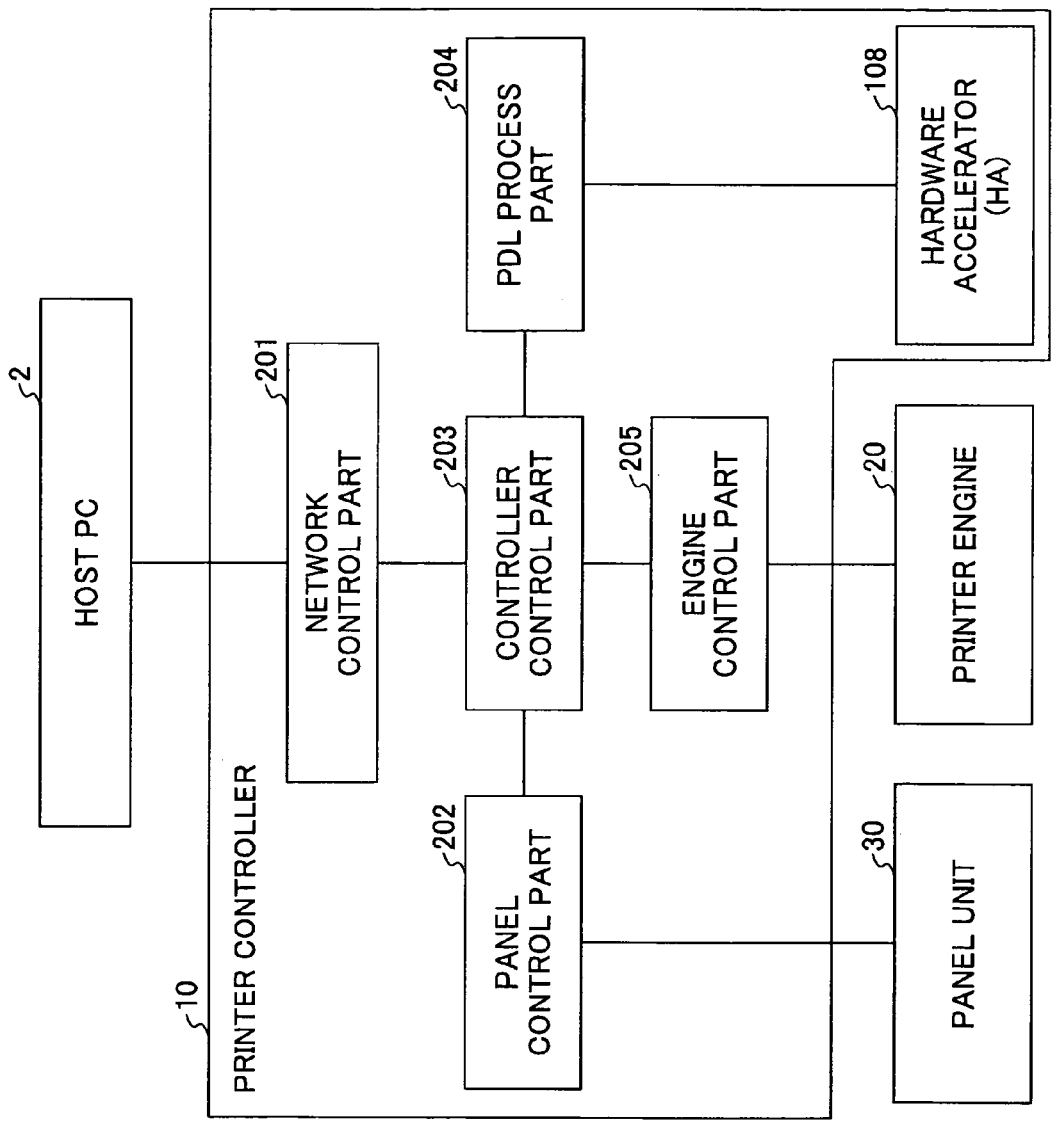
FIG. 2 shows a block diagram of one example of functions of a printer controller shown in FIG. 1.

Next, functions of the printer controller 10 will be described. FIG. 2 shows a block diagram of one example of functions of the printer controller 10.

A network control part 201 carries out sending and receiving data with the host PC 2. For example, the network control part 201 receives printing data from the host PC 2, and outputs the received printing data to a controller control part 203.

A panel control part 202 carries out control of the panel unit 30. The panel control part 202 outputs instructions from the panel unit 30 to the controller control part 203.

The controller control part 203 carries out sending and receiving data with respective parts, and controls the printer controller 10. For example, when receiving the printing data from the network control part 201, the controller control part 203 outputs the received printing data to a PDL process part 204.

The PDL process part 204 receives the printing data from the controller control part 203, and creates drawing data. Further, the PDL process part 204 outputs a part of the printing data to the HA 108.

As described above, the HA 108 carries out a rendering process by hardware. The HA 108 obtains the printing data from the PDL process part 204 and carries out the rendering process.

The network control part 201 may be made of, for example, the network I/F 105. The panel control part 202 may be made of, for example, the panel I/F 107. The controller control part 203 and the PDL process part 204 may be made of, for example, the CPU 101 and the RAM 103 acting as the page memory and the work memory, respectively. The engine control part 205 may be made of, for example, the engine I/F 106.

Figure 3:
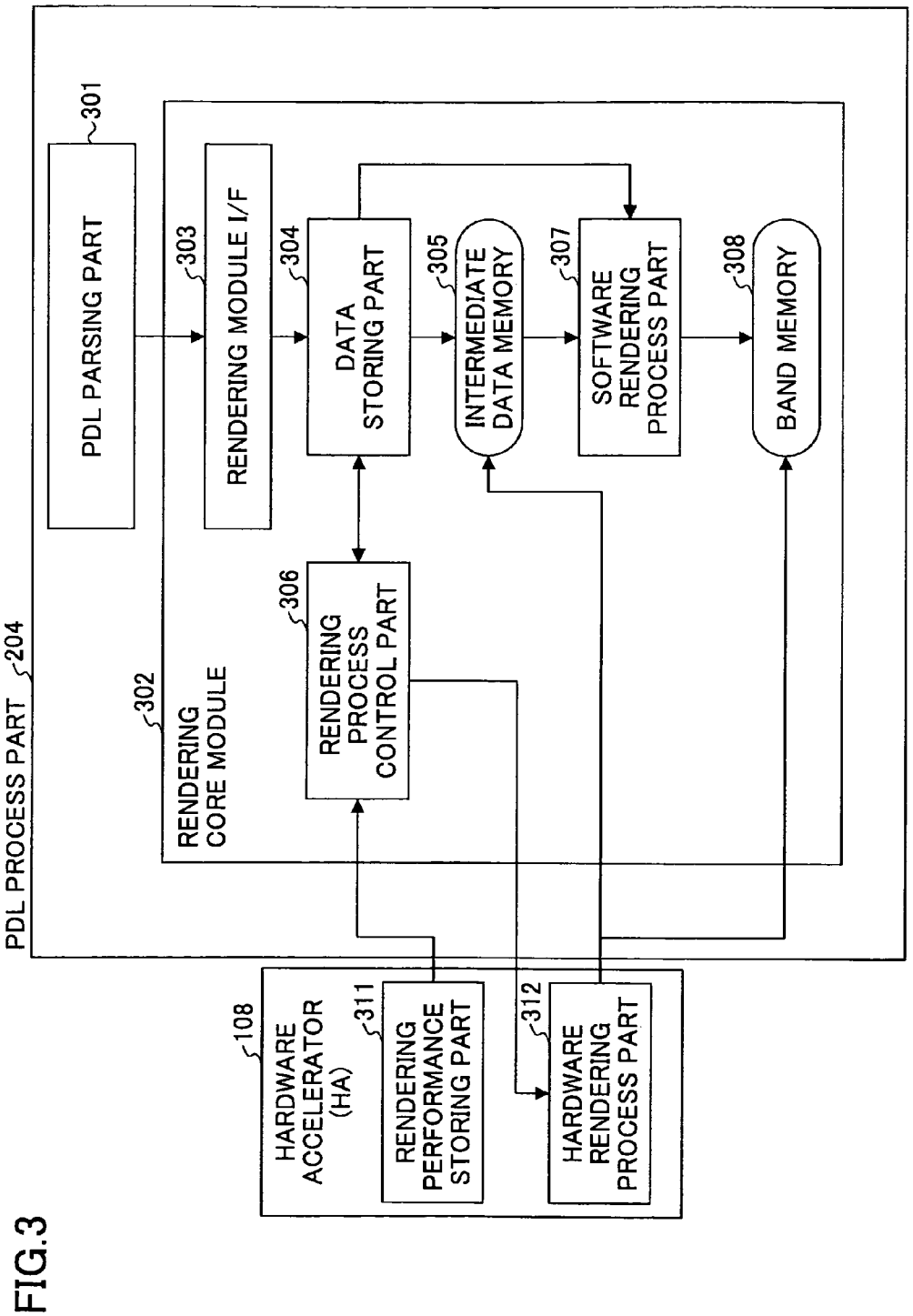
FIG. 3 shows a block diagram of one example of functions of a HA and a PDL process part shown in FIG. 2.

Next, functions concerning the rendering process will be described. FIG. 3 shows a block diagram of one example of functions of the HA 108 and the PDL process part 204.

The PDL process part 204 includes a PDL parsing part 301 and a rendering core module 302. The HA 108 includes a rendering performance storing part 311 and a hardware rendering process part 312.

The PDL parsing part 301 parses the printing data for each type of PDL of the printing data. The PDL parsing part 301 determines the type of PDL of the printing data, and carries out parsing that corresponds to the type of PDL of the printing data. The parsed printing data is output to the rendering core module 302.

The rendering core module 302 obtains the parsed printing data from the PDL parsing part 301, carries out a rendering process, and creates drawing data. The rendering core module 302 includes a rendering module I/F 303, a data storing part 304, an intermediate data memory 305, a rendering process control part 306, a software rendering process part 307 and a band memory 308.

The rendering module I/F 303 receives a drawing command such as a text, an image, or a vector graphic, and drawing setting information such as a color or a transparent setting from the PDL parsing part 301. The rendering module I/F 303 writes the received drawing command and drawing setting information to the data storing part 304. The data storing part 304 stores the drawing command and the drawing setting information.

The rendering process control part 306 accesses the data storing part 304, manages the drawing command, and outputs the drawing command and the drawing setting information to the hardware rendering process part 312 of the HA 108. The rendering process control part 306 controls the rendering process carried out by the hardware rendering process part 312 according to the drawing command.

The hardware rendering process part 312 writes intermediate data in the intermediate data memory 305, and the intermediate data memory 305 stores the written intermediate data. The intermediate data is data of a form suitable to the rendering process, and for example, includes mask information, color (multi level) background information, a logic drawing method, and so forth.

The software rendering process part 307 carries out rendering to generate drawing data based on the intermediate data that is stored in the intermediate data memory 305. The software rendering process part 307 outputs the drawing data, which is the result of the rendering, to the band memory 308. Alternatively, the software rendering process part 307 obtains the drawing command and the drawing setting information from the data storing part 304, and carries out rendering to the band memory 308.

Thus, rendering to the band memory 308 is carried out by the hardware rendering process part 312 and/or the software rendering process part 307. The band memory 307 stores the drawing data obtained from the rendering. A storage area of the band memory 308 is provided in the page memory area.

Figure 8B:
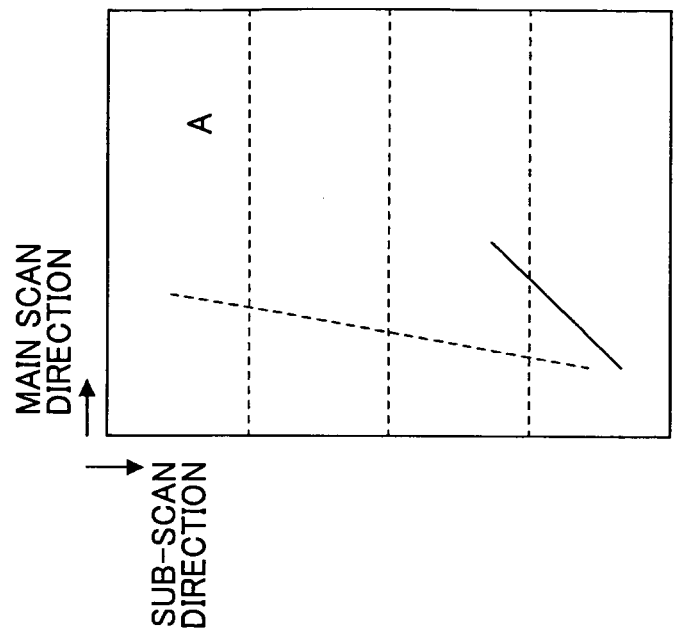
FIGS. 8A and 8B illustrates a banding method.
Figure 8A:
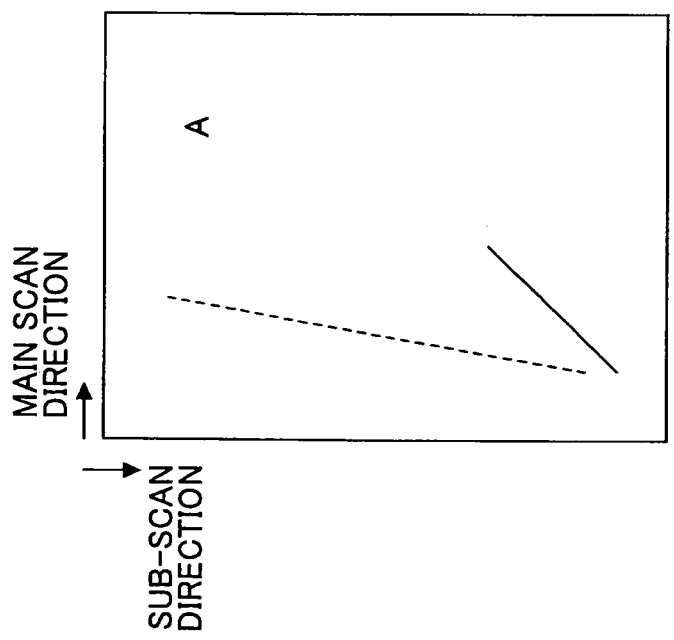

It is noted that in the image forming apparatus 1 in the embodiment, rendering processes are carried out according to a banding method, and thus, drawing data obtained from the rendering processes is output to the printer engine 20 from the printer controller 20 for each band. The banding method is such that as shown in FIGS. 8A and 8B, printing data including a collection of drawing commands for one page (for example, as shown in see FIG. 8A) is divided into plural bands. For example, as shown in FIG. 8B, the printing data for one page is divided in a sub-scan direction into four bands. Then, based on the thus-obtained printing data for a band, the hardware rendering process part 312 and/or the software rendering process part 307 carries out rendering processes and stores drawing data obtained from the rendering processes in the band memory 308.

The rendering performance storing part 311 stores information of the rendering performance of the HA 108. The hardware rendering process part 312 carries out a part of the rendering process on the printing data, obtained from the rendering process control part 306, by hardware. The hardware rendering process part 312 generates the intermediate data from the printing data according to an instruction from the rendering process control part 306, and writes the generated intermediate data in the intermediate data memory 305. Alternatively, the hardware rendering process part 312 generates drawing data from the parsed printing data according to an instruction from the rendering process control part 306, and writes the generated drawing data in the band memory 308.

(Rendering Process)

Role assignment between the hardware rendering process part 312 and the software rendering process part 307 will now be described. It is noted that a drawing command for an image requires a high data processing load, and a drawing command for text or a graphic requires a relatively low data processing load.

Therefore, by mounting a HA dedicated to a process of drawing an image, it is possible to achieve a highly effective improvement in data processing speed by using a relatively simple HA. Therefore, for example, the HA 108 is assumed to be a HA dedicated to a process of drawing an image.

The information indicating the rendering performance of the HA 108 is stored in the rendering performance storing part 311. The rendering process control part 306 obtains the information indicating the rendering performance of the HA 108 upon turning on of the power supply, and can understand for which process the HA 108 is suitable (or is dedicated) and for which process the HA 108 is not suitable (or is not dedicated). In this case, since the HA 108 is the HA dedicated to a process of drawing an image as mentioned above, the rendering process control part 306 causes the HA 108 to process a drawing command for an image.

The HA 108 and the CPU 101 can operate in parallel. An ideal system is such that an image rendering process carried out by the HA 108 is carried out in parallel with another process carried out by the CPU 101.

However, when rendering processes are assigned to the HA 108 and the CPU 101 in drawing command units, a coordinate of a drawing command and a coordinate of another drawing command may overlap with each other in a band to which rendering is carried out. In such a case, whether the HA 108 or the CPU 101 finishes the assigned rendering process earlier, it is necessary to keep the rendering order between the drawing commands designated by the host PC 2. Therefore, in many cases, the HA 108 having a higher processing speed for rendering than that of the CPU 101 waits for the CPU 101 to finish its own rendering process.

Figure 4A:
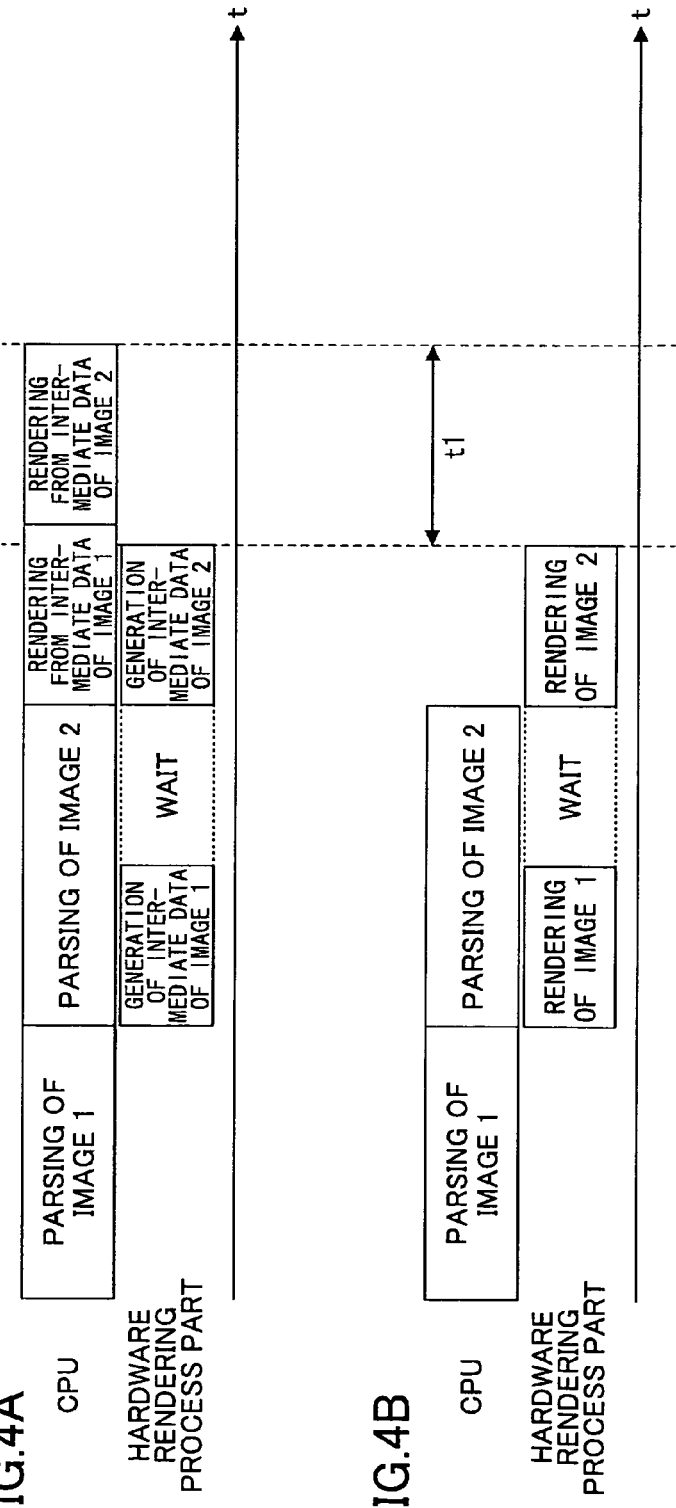
FIGS. 4A, 4B and 4C show processing time periods for processing drawing commands.
Figure 4B:
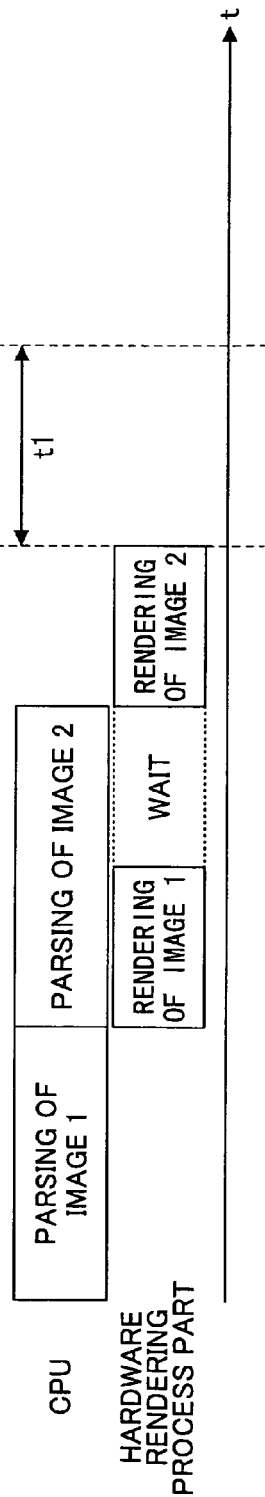
Figure 4C:
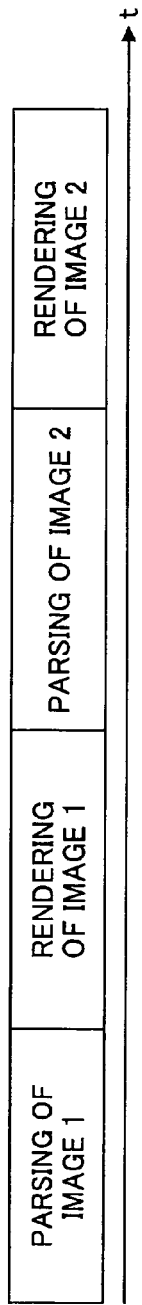

FIGS. 4A, 4B and 4C illustrate examples of processing time periods for processing image drawing commands. The examples include (1) a case where there is a likelihood that the coordinates of drawing commands overlap with each other (FIG. 4A); (2) a case where there is no likelihood that the coordinates of drawing commands overlap with each other (FIG. 4B); and (3) a case where all the rendering processes are carried out by the CPU 101 (FIG. 4C). With reference to the examples of FIGS. 4A, 4B and 4C, a difference in processing time periods will be described for a case where two successive image drawing commands (which may be simply referred to as images) are processed.

(1) A case where there is a likelihood that the coordinates of drawing commands overlap with each other (FIG. 4A):

In this case, in order to cause the HA 108 and the CPU 101 to carry out rendering processes in parallel, the CPU 101 carries out parsing for an image 1, and after that, the HA 108 generates intermediate data for the image 1. At this time, the HA 108 waits for the CPU 101 to finish parsing for the image 2, and then, the HA 108 starts generating intermediate data for the image 2.

It is noted that in a case where the HA 108 generates intermediate data as mentioned above with reference to FIG. 4A, the CPU 101 does not need to consider overlap of the coordinates of drawing commands. Therefore, the CPU 101 can render drawing data in the band memory 308 for one image in parallel with the HA 108 generating the intermediate data for another image. After the HA 108 generates the intermediate data, the CPU 101 renders drawing data in the band memory 308 based on the generated intermediate data.

(2) A case where there is no likelihood that the coordinates of drawing commands overlap with each other (FIG. 4B):

In this case, the HA 108 and the CPU 101 do not need to consider overlap of the coordinates of drawing commands. Therefore, the HA 108 generates drawing data for the image 1 after the CPU 101 finishes parsing for the image 1, and renders the generated drawing data in the band memory 308. Similarly, the HA 108 generates drawing data for the image 2 after the CPU 101 finishes parsing for the image 2, and renders the generated drawing data in the band memory 308.

In this case, the HA 108 and the CPU 101 do not need to consider overlap of the coordinates of drawing commands as mentioned above. Therefore, for example, the CPU 101 may render drawing data for an image in the band memory 308 in parallel with the HA 108 rendering drawing data for another image in the band memory 308.

(3) A case where all the rendering processes are carried out by the CPU (FIG. 4C):

In the case where all the rendering processes are carried out by the CPU 101, the CPU 101 carries out parsing for the image 1, rendering of the image 1, parsing for the image 2 and rendering of the image 2, in the stated order.

Thus, in comparison between the cases of (1) and (2), all the rendering processes are finished in the case of (2) earlier than the case of (1) by a time period t1. However, in the case of (1), parsing the drawing command by the CPU 101 and generating the intermediate data by the HA 108 are carried out in parallel. Therefore, the processing time period in the case of (1) is shorter than that of the case of (3). Hereinafter, a mode where the hardware rendering process part 312 of the HA 108 generates intermediate data (as in the case of (1)) will be referred to as an intermediate data generation mode. A mode where the hardware rendering process part 312 of the HA 108 generates drawing data (as in the case of (2)) and directly renders the drawing data in the band memory 308 will be referred to as a band rendering mode.

Thus, according to the embodiment, it is determined whether the coordinates of drawing commands overlap with each other (hereinafter, simply referred to as "overlap determination"). Then, based on the determination result, it is determined whether the hardware rendering process part 312 of the HA 108 is caused to generate intermediate data or directly render drawing data in the band memory 308.

(Overlap Determination)

The rendering process control part 306 carries out overlap determination by using, for example, types (BMLinkS, PictBridge and so forth) of PDL of the printing data. For example, the rendering process control part 306 determines that there is a likelihood that the coordinates of drawing commands overlap, in a case where PDL of the printing data is predetermined PDL such as PS (PostScript), PCL (Printer Control Language) or PDF (Portable Document Format).

Alternatively, the rendering process control part 306 actually carries out determination as to whether the coordinates of drawing commands overlap with each other based on the attribute values of the drawing commands, and determines whether line drawings, obtained from rendering based on the drawing commands, overlap with each other in the band memory 308 (hereinafter, such a method being simply referred to as "drawing command coordinate determination").

When determining that there is a likelihood that the coordinates of the drawing commands overlap with each other, the rendering process control part 306 controls the hardware rendering process part 312 of the HA 108 to cause it to generate intermediate data (i.e., sets the intermediate data generation mode for the HA 108). The generated intermediate data is stored in the intermediate data memory 305. On the other hand, when determining that there is no likelihood that the coordinates of the drawing commands overlap with each other, the rendering process control part 306 controls the hardware rendering process part 312 to cause it to generate drawing data and directly draw the drawing data in the band memory 308 (i.e., sets the band rendering mode).

The software rendering process part 307 realized by the CPU 101 generates drawing data based on the intermediate data stored in the intermediate data memory 305, and renders the drawing data in the band memory 308.

The overlap determination by the rendering process control part 306 is carried out for each job in the case where the overlap determination is carried out based on the type of the PDL. The overlap determination by the rendering process control part 306 is carried out for each page or for each band in the case where the "drawing command coordinate determination" is carried out.

The reason why the overlap determination is carried out based on the type of the PDL will now be described. It is noted that the "drawing command coordinate determination" may include determination for all the drawing commands included in the target page or band to be carried out before the rendering processes are carried out.

Therefore, in consideration of the data processing load of the overlap determination, there may be a case where, consequently, the rendering processes are carried out at a higher speed by setting the intermediate data generation mode for the HA 108 without carrying out the overlap determination instead of the band rendering mode. Therefore, in a case where the type of PDL of the printing data is a printing language such as PS, PCL or PDF in which the number of drawing commands is large per each page and there is a likelihood that the coordinates to render overlap with each other, the intermediate data generation mode is set without carrying out the overlap determination. The overlap determination may be carried out once at the start of the printing job at which the type of the PDL is determined.

It is noted that the rendering process control part 306 may carry out control such that drawing commands for which the hardware rendering process part 312 is suitable will be carried out by the hardware rendering process part 312, and the other drawing commands will be carried out by the software rendering process part 307.

Thus, there are the two modes, i.e., the intermediate generation mode and the band rendering mode, when the drawing command is processed by the HA 108. In the intermediate generation mode, the HA 108 generates intermediate data of the form suitable for the rendering process from the printing data, and outputs the generated intermediate data to the intermediate data memory 305. The software rendering process part 307 realized by the CPU 101 renders drawing data in the band memory 308 based on the intermediate data stored in the intermediate data memory 305. Therefore, even when the HA 108 generates intermediate data at a high speed, the order of rendering is stored for the intermediate data, and the order of rendering drawing data in the band memory 308 based on drawing commands is kept even when the drawing commands include one not processed by the HA 108 but processed by the CPU 101.

In the band rendering mode, the HA 108 carries out a rendering process on printing data to generate drawing data, and renders the drawing data in the band memory 308. In this case, as mentioned above, it is not necessary to consider the order of rendering since there is no likelihood that the coordinates of the drawing commands overlap with each other. Therefore, the hardware rendering process part 312 and the software rendering process part 307 may draw drawing data in the band memory 308 in parallel.

Therefore, it is possible to efficiently use the resources, i.e., the HA and the CPU depending on drawing commands.

<Operations>

Figure 5:
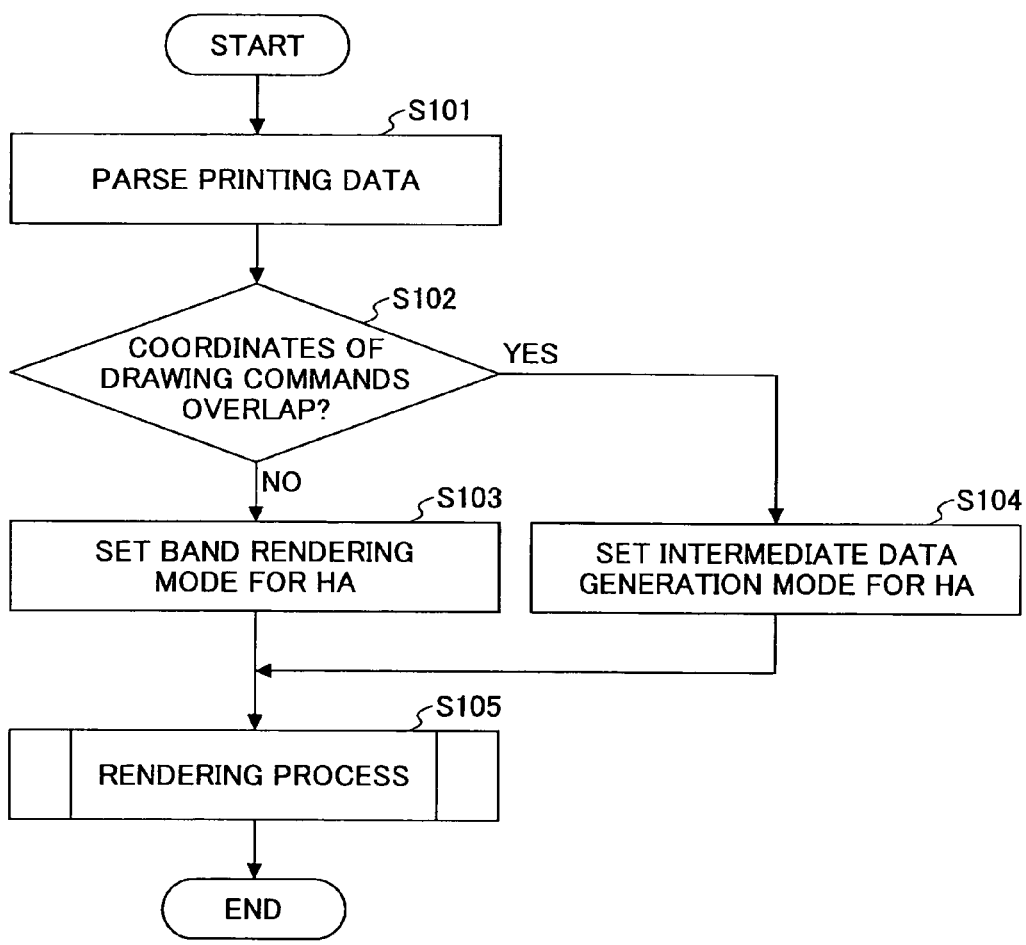
FIG. 5 shows a flowchart of one example of a rendering control process according to the embodiment of the present invention.

Next, operations of the image forming apparatus in the embodiment will be described. FIG. 5 shows a flowchart of one example of a rendering control process. In step S101 of FIG. 5, the PDL parsing part 301 parses given printing data (including drawing commands).

In step S102, the rendering process control part 306 determines, based on the parsed printing data, whether the coordinates of the drawing commands overlap with each other. This overlap determination may be carried out based on the coordinates included in the attribute values of the drawing commands (i.e., the "drawing command coordinate determination") or may be carried out by determining whether the type of PDL of the drawing commands (or PDL of the printing data) is the predetermined PDL. When there is no likelihood that the coordinates of the drawing commands overlap with each other (step S102—NO), step S103 is proceeded to. When there is a likelihood that the coordinates of the drawing commands overlap with each other (step S102—YES), step S104 is proceeded to.

In step S103, the rendering process control part 306 carries out control such that the band rendering mode is set for the HA 108.

In step S104, the rendering process control part 306 carries out control such that the intermediate data generation mode is set for the HA 108.

In step S105, the HA 108 and the CPU 108 carry out rendering processes based on the parsed printing data according to the mode set in step S103 or S104. The rendering processes will be described with reference to FIGS. 6 and 7.

Figure 6:
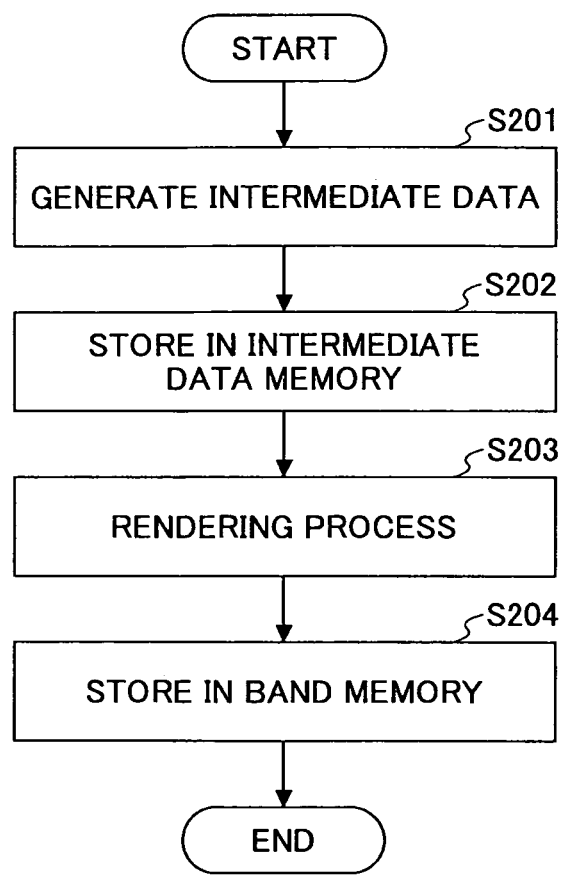
FIG. 6 shows a flowchart of one example of a rendering process in an intermediate data generation mode shown in FIG. 5.

FIG. 6 shows a flowchart of one example of rendering processes according to the intermediate data generation mode. In step S201 of FIG. 6, the hardware rendering process part 312 generates intermediate data from the parsed printing data.

In step S202, the hardware rendering process part 312 stores the generated intermediate data in the intermediate data memory 305.

In step S203, the software rendering process part 307 carries out a rendering process to a band based on the intermediate data stored in the intermediate data memory 305.

In step S204, the band memory 308 stores drawing data obtained from the rendering process carried out by the software rendering process part 307 in step S203.

Figure 7:
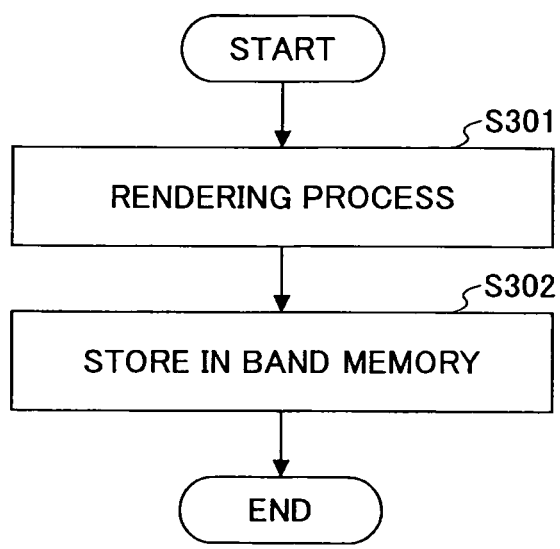
FIG. 7 shows a flowchart of one example of a rendering process in a band rendering mode shown in FIG. 5.

FIG. 7 shows a flowchart of one example of rendering processes according to the band rendering mode. In step S301 of FIG. 7, the hardware rendering process part 312 carries out a rendering process to a band based on the parsed printing data.

In step S302, the band memory 308 stores drawing data obtained from the rendering process carried out by the hardware rendering process part 312 in step S301.

Thus, according to the embodiment, by setting any one of the respective rendering modes (i.e., the intermediate data generation mode and the band rendering mode) for the HA 108 depending on drawing commands (or printing data), it is possible that the HA 108 and the CPU 101 carry out rendering processes in parallel and thus, it is possible to use the resources efficiently. For example, it is possible to shorten a processing time period for a printing process to process many full color images.

It is noted that when both the CPU 101 and the HA 108 are provided and any one of the CPU 101 and the HA 108 can carry out rendering to a band, a likelihood of overlapping the coordinates to render by drawing commands is determined in a case where a process is assigned to the HA 108 for each of the drawing commands. Then, when there is a likelihood of the overlapping in the band, one drawing command may overlap with another drawing command in the band for which rendering is carried out. Therefore, even in an environment where both the CPU 101 and the HA 108 can carry out rendering in parallel, it may not be possible to actually carry out parallel operations of rendering to the band since it is necessary to keep the order of rendering.

In contrast thereto, when there is no likelihood of overlapping the coordinates to render by the drawing commands in the band, it is not necessary to consider the order of rendering. Therefore, the HA 108 and the CPU 101 can carry out parallel operations of rendering to the band, and thus, it is possible to carry out rendering processes at a high speed.

Further, even when there is a likelihood of overlapping of the coordinates to render by the drawing commands in the band, the HA 108 and the CPU 101 can carry out parallel operations when the HA 108 does not render to the band (i.e., the band memory 308) but to the intermediate data area (i.e., the intermediated data memory 305). In this case, an extra process of rendering to the band using the intermediate data by the CPU 101 is required. However, a process of converting the drawing command into the intermediate data by the HA 108 and a process (that may be a process of rendering to the band) by the CPU 101 can be carried out in parallel. Thus, it is possible to improve the processing speed.

It is noted that the program executed in the image forming apparatus according to the embodiment is a file of an installable form or an executable form, is provided in a form of being recorded in a computer readable recording medium such as a CD-ROM (Compact Disk Read Only Memory), a flexible disk (FD), a CD-R (Compact Disk Readable) or a DVD (Digital Versatile Disk).

Further, the program executed in the image forming apparatus according to the embodiment may be stored in a computer connected to a communication network such as the Internet, and may be provided to a user by being downloaded by the user via the communication network. Further, the program executed in the image forming apparatus according to the embodiment may be provided or delivered via a communication network such as the Internet.

Further, the program executed in the image forming apparatus according to the embodiment may be provided in a form of being stored in a ROM or such.

The program executed in the image forming apparatus according to the embodiment is configured in a form of a module including the above-described respective parts. As actual hardware, the CPU (processor) 101 reads the program from the ROM 102, and executes the program. Thus, one or plural ones of the above-mentioned respective parts is/are loaded in the RAM 103, and thus the one or plural ones of the above-mentioned respective parts is/are created in the RAM 103.

The present invention is not limited to the specifically disclosed embodiment, and variations and modifications may be made without departing from the scope of the present invention. The present invention may be embodied in a form where the elements of the present invention are modified without departing from the scope of the present invention. Further, it is possible to create various configurations by appropriately combining plural ones of the elements disclosed in the above-mentioned embodiment. For example, it is possible to omit one or plural ones from all of the elements disclosed in the embodiment.

The present application is based on Japanese Priority Patent Application No. 2010-201385 filed on Sep. 8, 2010, the entire contents of which are hereby incorporated herein by reference.

What is claimed is:

1. An image forming apparatus comprising:
a parsing part configured to parse printing data;
plural rendering process parts configured to carry out a rendering process on the parsed printing data;
a band memory to which each of the plural rendering process parts carries out the rendering;
a rendering control part configured to carry out rendering control, based on a parsing result of the parsing part, to cause a predetermined one of the plural rendering process parts to generate intermediate data or carry out the rendering to the band memory; and
a data memory configured to store the intermediate data generated by the predetermined one of the plural rendering process parts, wherein
another of the plural rendering process parts carries out the rendering to the band memory by using the intermediate data stored in the data memory,
wherein the rendering control part is configured to, in a case of determining that coordinates of drawing commands for a predetermined unit do not overlap with each other, carry out control to cause the predetermined one of the plural rendering process parts to carry out the rendering to the band memory, and in a case of determining that the coordinates of the drawing commands for the predetermined unit overlap with each other, carry out control to cause the predetermined one of the plural rendering process parts to output the intermediate data to the data memory.

2. The image forming apparatus as claimed in claim 1, wherein
the rendering control part determines whether the coordinates of the drawing commands overlap with each other by using the coordinates of the drawing commands.

3. The image forming apparatus as claimed in claim 1, wherein
the rendering control part determines that the coordinates of the drawing commands overlap with each other when the printing data is written in a predetermined Page Description Language (PDL), and determines that the coordinates of the drawing commands do not overlap with each other when the printing data is not written in the predetermined PDL.

4. The image forming apparatus as claimed in claim 1 wherein
the predetermined one of the plural rendering process parts is the one, highest in speed of rendering, of the plural rendering process parts.

5. A rendering control method for an image forming apparatus that includes plural rendering process parts and a band memory to which each of the plural rendering process parts carries out rendering, the method comprising:
parsing printing data;
carrying out rendering control, based on a result of the parsing, to cause a predetermined one of the plural rendering process parts to generate intermediate data or carry out the rendering to the band memory;
in a case where the intermediate data is generated by the predetermined one of the plural rendering process parts, storing the intermediate data generated by the predetermined one of the plural rendering process part in a data memory;
another of the plural rendering process parts carrying out the rendering to the band memory using the intermediate data stored in the data memory;
in a case of determining that coordinates of drawing commands for a predetermined unit do not overlap with each other, carrying out control to cause the predetermined one of the plural rendering process parts to carry out the rendering to the band memory; and
in a case of determining that the coordinates of the drawing commands for the predetermined unit overlap with each other, carrying out control to cause the predetermined one of the plural rendering process parts to output the intermediate data to the data memory.

6. The rendering control method as claimed in claim 5, further comprising:
determining whether the coordinates of the drawing commands overlap with each other by using the coordinates of the drawing commands.

7. The rendering control method as claimed in claim 5, further comprising:
determining that the coordinates of the drawing commands overlap with each other when the printing data is written in a predetermined Page Description Language (PDL); and
determining that the coordinates of the drawing commands do not overlap with each other when the printing data is not written in the predetermined PDL.

* * * * *